M. M. Preble,
Fly Trap,
N° 61,358.   Patented Jan. 22, 1867.
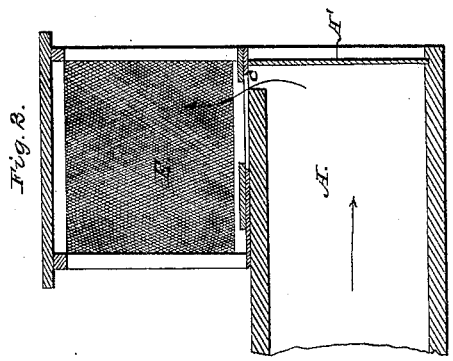
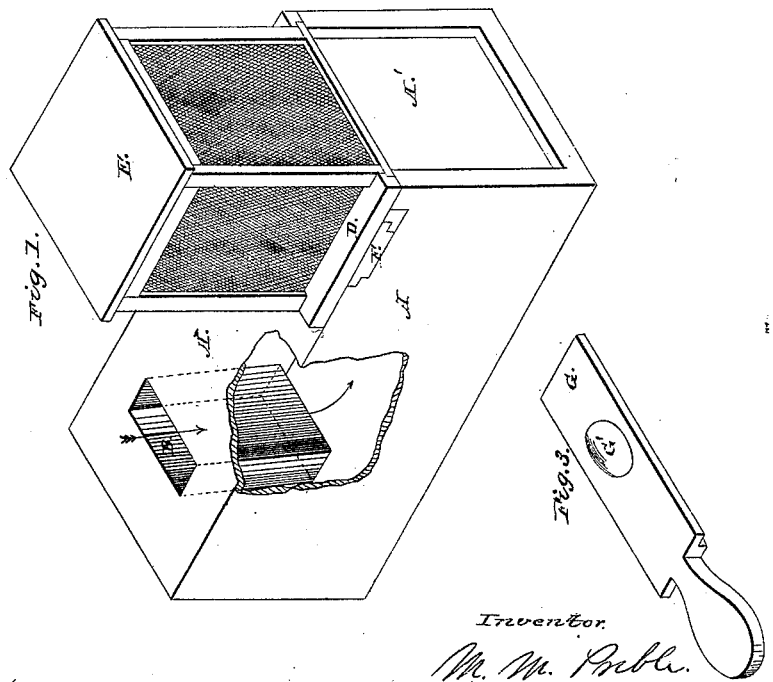
Witnesses.
Inventor.
M. M. Preble.
by
D. P. Holloway & Co.
his attys.

United States Patent Office.

M. M. PREBLE, OF KOKOMO, INDIANA.

Letters Patent No. 61,358, dated January 22, 1867.

---

IMPROVEMENT IN FLY-TRAPS.

---

The Schedule referred to in these Letters Patent and making part of the same.

---

TO ALL WHOM IT MAY CONCERN:

Be it known that I, M. M. PREBLE, of Kokomo, in the county of Howard, and State of Indiana, have invented a new and useful Improvement in Fly-Traps; and I do hereby declare that the following is a full, clear, and exact description of the same, reference being had to the accompanying drawings, in which—

Figure 1 is a perspective view of same.

Figure 2, a longitudinal section of part of same.

Figure 3 is a slide.

The same letters of reference denote identical parts in all the figures.

To enable others skilled in the art to make and use my invention, I will proceed to describe its construction and operation.

At one end of the top piece of box A, a tube, B, is fixed, reaching part way to the bottom, where honey, molasses, or some other bait is put, in order to coax the fly down in the box. At the other end of the box A the end piece A' is made of glass or other transparent material. The fly having satisfied its appetite will not remain in the dark end of the box, but fly to the transparent end piece A', and trying to get out, will soon find the opening C, through which it will pass into the upper box E. Box E is square; its sides are formed with wire screens, and moves on the top of box A in slides D, whereby the opening in the bottom of box E, and the corresponding opening in the top piece of box A may be regulated, and, if desired, entirely shut by moving box E far enough towards tube B. A slide, F, is inserted in the top of the box under the box E, when in place forming a part of the top. This slide may be displaced by the slide G of the same size and moving in the same grooves.

When the operator wants to kill the flies, he fills the recess G' in the slide G, with sulphur or other combustible substance, ignites it and pushes out slide F, inserting slide G in its place. When the flies are killed, he separates the boxes, removes the dead flies contained in box E, and puts it again into position.

What I claim as my invention, and desire to secure by Letters Patent, is—

The combination of the boxes A and E, and slides G and F, the said parts being constructed and arranged substantially in the manner and for the purpose set forth.

In testimony whereof I have signed my name to this specification in the presence of two subscribing witnesses.

M. M. PREBLE.

Witnesses:
   J. H. KROH,
   A. B. MELKER.